Patented Dec. 6, 1932

1,890,202

UNITED STATES PATENT OFFICE

JOHN M. TINKER AND LOUIS SPIEGLER, OF SOUTH MILWAUKEE, WISCONSIN, ASSIGNORS TO E. I. DU PONT DE NEMOURS & COMPANY, OF WILMINGTON, DELAWARE, A CORPORATION OF DELAWARE

PROCESS OF PURIFYING ARYLIDES OF 2,3-HYDROXY-NAPHTHOIC ACID

No Drawing. Application filed November 16, 1931. Serial No. 575,485.

This invention relates to a process of purifying dyestuff intermediates of the hydroxy-naphthoic acid arylide series. It is an object of this invention to provide a simple, inexpensive and efficient method for purifying arylides of 2,3-hydroxy-naphthoic acid. Other and further important objects of this invention will appear as the description proceeds.

The arylides of 2,3-hydroxy-naphthoic acid are generally prepared by reacting 2,3-hydroxy-naphthoic acid with the desired arylamines in an inert solvent in the presence of phosphorus trichloride or similar dehydrating agents. In our copending application Ser. No. 575,484, filed of even date herewith is described a modification of said process whereby the basic arylamine is replaced by a halogen acid salt thereof, such as the hydrochloride. According to other methods in the literature, the reaction is effected between 2,3-hydroxy-naphthoyl-chloride and the desired arylamine.

In all the above cases the arylide body directly as obtained from the reaction mixture, that is, after removal of the solvent by evaporation in the presence of water, and washing the precipitate free of phosphorous acid, is not obtained in pure state, but contains various impurities which affect the shade of the ultimate dyestuff. In order to obtain the pure shade characteristic of the particular arylide, it is necessary to subject the said isolated product to a purification treatment.

Two methods of purification have generally been practiced in the art. According to one of these methods, the arylide of 2,3-hydroxy-naphthoic acid is dissolved in caustic soda solution, filtered, and the filtrate run into acid. According to the other method the arylide is recrystallized from an organic solvent such as chlorobenzene, nitrobenzene, glacial acetic acid, etc.

Both of the above methods, however, suffer from serious defects which reduce their efficiency. The first method requires dissolving the arylide in a large volume of relatively concentrated caustic. In alkaline medium of such high concentration the hydroxy-naphthoic arylide body is somewhat unstable and tends to decompose or polymerize, with the result that although certain impurities are removed by the treatment, others are introduced in substitution, sometimes even in greater quantity than the original impurities, especially if the alkaline solution of the arylide is permitted to stand for any length of time. When the caustic solution is now poured into acid, these impurities precipitate together with the arylide body. The second method requires laborious and time consuming recrystallizations, and furthermore, occasions great losses of the arylide body due to its partial solubility in the mother liquors. Sometimes the quantity dissolved in the mother liquor can be recovered, but this, of course, requires further laborious and time consuming operations such as partial distillation and crystallization.

A third method has sometimes been practiced, namely boiling in weak mineral acid. This process, however, does not extract all the undesirable impurities, and is furthermore objectionable because it requires special acid proof equipment.

We have now found that arylides of 2,3-hydroxy-naphthoic acid can be very effectively rid of their attendant impurities by extraction with mild alkalis, which are not strong enough to dissolve appreciable amounts of the arylide body. As examples of such mild alkalis, aqueous ammonia or sodium bicarbonate solutions may be mentioned. The simplicity and efficiency of this method will be at once apparent. In the first place the entire procedure requires but a single operation, namely, the treatment of the arylide body with the mild alkali followed by filtration and washing. No reprecipitation from acid or resolution and recrystallization from an organic solvent are necessary. In the second place, since the arylide body remains in solid state throughout the treatment, its stability is not disturbed, and no observable decomposition of it takes place.

To effect intimate contact between the arylide body and the extracting solvent, the two are preferably milled together in a rotary mill, either wet or dry and with or without a wetting agent. Where the dry method of milling is employed, the resultant intimate dry mixture is subsequently suspended in water and filtered. Any other means, however, for mechanically mixing the arylide body and the weak alkaline solution may be resorted to. When the milling operation has been carried on for a sufficient length of time to effect intimate contact, the suspension is filtered, and the filter cake washed with water until free of alkali.

The resultant paste is directly suitable for use in the manufacture of water insoluble azo dyestuffs, in substance or on textile fiber. The colors thus obtained are of high brilliance and exhibit the true shade and brightness characteristic of the particular arylide and the particular diazo component selected.

Without limiting our invention to any specific procedure, the following examples are given to illustrate our preferred mode of carrying out the same. Parts given are parts by weight.

*Example 1*

A wet filter cake, as obtained in the manufacture of 2,3-hydroxy-naphthoic acid anilide after washing the product free of acid, and containing 500 parts of 2,3-hydroxy-naphthoic acid anilide are milled together with 70 parts of 20% aqueous ammonia in the presence of sufficient water to insure efficient milling. When the anilide has been reduced to sufficiently fine size to insure intimate contact with the ammonia, the mixture is filtered, and washed with warm water until free of alkali. The product, when dried, melts at 247–248° C. When used for the production of developed colors upon textile fibers it gives true and very bright shades.

*Example 2*

500 parts of dry 2,3-hydroxy-naphthoic acid-o-toluidide (M. P. 176–186° C.) are milled in a ball mill together with 50 parts of sodium bicarbonate, until an intimate fine mixture of the two ingredients is effected. The product may now be stirred up in water and filtered. Alternatively, it may be stored or shipped for future treatment with water. The filter cake, when washed with water until free of alkali, and dried, gives a highly pure product, melting at 195–196° C. When used for the production of colors upon textile fiber it gives extremely bright and true shades. If the alkaline mother liquors are acidified, a product precipitates, melting, when dry, at about 155–170° C.

*Example 3*

500 parts of dry 2,3-hydroxy-naphthoic acid-p-anisidide are milled in a ball mill together with 50 parts of potassium bircarbonate and 0.1 part of the sodium salt of isopropyl-naphthalene-sulfonic acid. The object of the latter is to aid in the subsequent wetting of the particles when the mixture is suspended in water. When thus suspended, stirred, filtered and washed free of alkali, an extremely pure product is obtained, melting at 229.5–230° C. This is practically 5° C. higher than the melting point given in the literature, and fully 6–7° C. higher than the melting point of the p-anisidide of commerce.

*Example 4*

A wet cake containing 500 parts of the 2, 5-diamethoxy-anilide of 2,3-hydroxy-naphthoic acid are milled together with 100 parts of sodium acetate crystals, in the presence of sufficient water to dissolve the entire quantity of acetate and to form a free-milling suspension of the arylide. The milling is continued until an intimate, fine, yet filterable suspension is obtained. The latter is filtered, and if washed free of alkali will give a product of considerably greater purity than the initial material. However, in view of the weak alkali employed, the product is not at its highest purity directly from the first treatment. To increase the purity of this product it is advantageous to subject the last filter cake to repeated milling with sodium acetate or any other weak alkali in the same manner as the initial material was treated. Two or three treatments as above outlined will give a product melting at 184–185.4° C.

*Example 5*

586 parts of a dry powder analyzing 85.3% of 2,3-hydroxy-naphthoic acid-$\beta$-naphthalide are milled with 70 parts of 20% aqueous ammonia as described in Example 1. The product, after filtering, washing and drying, contains 480 parts of pure 2,3-hydroxy-naphthoic acid-$\beta$-naphthalide. When used as coupling component with diazo compounds it develops upon fabric bright colors equalling in shade those obtained by the use of Naphthol ASSW of commerce. The initial material when coupled to the same component and tested against the same standard, produces very dull shades.

In a similar manner other weakly alkaline salts may be used; for instance, borax, disodium-hydrogen-phosphate, and the like.

It will be understood that many variations and modifications are possible in our procedure without departing from the spirit of this invention. For instance any of the above mentioned mild alkalis, or any other mildly alkaline compounds may be used with any particular arylide of 2,3-hydroxy-naphthoic acid. The proportion of alkaline agent to arylide body may be varied within wide limits. Excessive amounts are, however, to be avoided, in order to prevent possible loss of the arylide body by solution.

Where the treatment is insufficient to give a product of desired purity in one extraction, it is preferable to repeat the operation rather than increase the proportion of alkaline substance. The desired degree of purity may be tested by the melting point of the final product, or by repeating the extraction on a small sample and testing the alkaline mother liquors, by acidification, for extracted organic matter. Wetting agents, such as the sodium salt of isopropyl-naphthalene-sulfonic acid, the sodium salt of abietene-sulfonic acid, and the like, may be used with any of the alkaline agents or with any of the arylides for the purpose of improving their wetting during their treatment with water. Dry compositions of the arylide body and an alkaline agent, with or without wetting agent, may be made up for distribution in the trade, to be extracted by the direct consumer by the mere steps of stirring in water, filtering and washing. Numerous other variations and improvements will readily suggest themselves to those skilled in the art.

We claim:

1. The process of purifying an arylide of 2,3-hydroxy-naphthoic acid, which comprises milling the same with an aqueous solution of a mild alkali which is not strong enough to dissolve appreciable quantities of the arylide body, filtering, and washing the filter cake until substantially free of alkali.

2. The process of purifying an arylide of 2,3-hydroxy-naphthoic acid, which comprises milling the same with an aqueous solution of a mild alkali selected from the group consisting of ammonia, alkali metal bicarbonates, acetates, acid phosphates, and borates, filtering, and washing the filter cake until substantially free of alkali.

3. In the process of purifying an arylide of 2,3-hydroxy-naphthoic acid, the step which comprises forming an intimate mixture of the same with a water soluble, mildly alkaline compound selected from the group consisting of ammonia and water-soluble bicarbonates, acetates, borates and acid phosphates.

4. In the process of purifying an arylide of 2,3-hydroxy-naphthoic acid, the step which comprises dry milling the same with a water soluble, mildly alkaline compound.

5. In the process of purifying an arylide of 2,3-hydroxy-naphthoic acid, the step which comprises dry milling the same with a water soluble, mildly alkaline compound, and a wetting agent.

6. In the process of purifying an arylide of 2,3-hydroxy-naphthoic acid, the step which comprises dry milling the same with a water soluble, mildly alkaline compound, of the group comprising water soluble bicarbonates, acetates, borates and acid phosphates.

7. In the process of purifying an arylide of 2,3-hydroxy-naphthoic acid, the step which comprises dry milling the same with a water soluble, mildly alkaline compound, of the group comprising water soluble bicarbonates, acetates, borates and acid phosphates, and with a wetting agent.

8. As a composition of matter an intimate, dry mixture of an arylide of 2,3-hydroxy-naphthoic acid and a water-soluble, mildly alkaline compound in finely divided form.

9. As a composition of matter an intimate, dry mixture of an arylide of 2,3-hydroxy-naphthoic acid and a water-soluble, mildly alkaline compound in finely divided form selected from the group consisting of water-soluble bicarbonates, acetates, borates and acid phosphates.

10. As a composition of matter an intimate, dry mixture of an arylide of 2,3-hydroxy-naphthoic acid, a wetting agent, and a water-soluble, mildly alkaline compound, the entire mixture being in finely divided form.

11. As a composition of matter an intimate, dry mixture of an arylide of 2,3-hydroxy-naphthoic acid, a wetting agent, and a water soluble, mildly alkaline compound, selected from the group consisting of water soluble bicarbonates, acetates, borates and acid phosphates, the entire mixture being in finely divided form.

In testimony whereof we affix our signatures.

JOHN M. TINKER.
LOUIS SPIEGLER.